(12) United States Patent
Riedle

(10) Patent No.: US 6,983,334 B2
(45) Date of Patent: Jan. 3, 2006

(54) METHOD AND SYSTEM OF TRACKING MISSING PACKETS IN A MULTICAST TFTP ENVIRONMENT

(75) Inventor: Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/007,190

(22) Filed: Nov. 7, 2001

(65) Prior Publication Data

US 2003/0088667 A1    May 8, 2003

(51) Int. Cl.
*G06F 15/16* (2006.01)
(52) U.S. Cl. ...................................... 709/250
(58) Field of Classification Search ............... 370/394, 370/351, 353, 354, 355, 463; 709/202, 224, 709/230, 249, 250, 204, 205, 219
See application file for complete search history.

(56) References Cited

U.S. PATENT DOCUMENTS

| | | | |
|---|---|---|---|
| 5,151,889 A | 9/1992 | Saimi et al. |
| 5,577,211 A | 11/1996 | Annapareddy et al. |
| 5,648,970 A | 7/1997 | Kapoor |
| 5,872,777 A | 2/1999 | Brailean et al. |
| 5,993,056 A | 11/1999 | Vaman et al. |
| 6,011,796 A | 1/2000 | Rezaiifar et al. |
| 6,145,109 A | 11/2000 | Schuster et al. |
| 6,151,696 A | 11/2000 | Miller et al. |
| 6,185,623 B1 | 2/2001 | Bailey et al. |
| 2003/0016627 A1 * | 1/2003 | MeLampy et al. .......... 370/235 |

FOREIGN PATENT DOCUMENTS

WO     WO 96/38963    12/1996

\* cited by examiner

*Primary Examiner*—Andrew Caldwell
*Assistant Examiner*—Cheryl M. Reid
(74) *Attorney, Agent, or Firm*—Martin J. McKinley; Dillon & Yudell LLP

(57) ABSTRACT

A method, system, and program product for efficiently tracking lost data packets in a multicast TFTP network environment. An algorithm is encoded within the receiving client processing system that tracks received packets within a 64 Kbit tracking array. The array is stored in memory. If the number of packets of a file being transmitted is larger than 64K, the algorithm performs a grouping function, by which each set of two neighboring spaces within the array are combined. Combining of the spaces involves ANDing the spaces together, and the ANDed results stored within a single space indicates whether or not the packets within the group needs to be re-requested. Thus if either one of the values in the spaces is a zero (indicating that the corresponding packet is lost) then the combined space is tagged with a zero. In this way, when the client is determining which packet(s) or groups to re-request, the client checks the array for holes (i.e., 0's) and re-requests the packet(s) represented by each hole found.

28 Claims, 7 Drawing Sheets

METHOD AND SYSTEM OF TRACKING MISSING PACKETS IN A MULTICAST TFTP ENVIRONMENT

BACKGROUND OF THE INVENTION

1. Technical Field

The present invention is generally related to network data transfers and in particular to multicast network data transfer in a Trivial File Transfer Protocol (TFTP) environment. Still more particularly, the present invention is related to a method and system for tracking missing packets in a multicast TFTP network environment.

2. Description of the Related Art

Data communications involves the transfer of data from one or more originating data sources (sender/server) to one or more destination data receivers (receiving client). The transfer is accomplished via one or more data links between the one or more origination data sources and destination data receivers according to a communication protocol. Thus, a data communications network comprises three or more communicating entities (e.g., origination and destination data sources) interconnected over one or more data links.

In data communications networks, messages or files are usually split into small packets to conform to the communications protocol being utilized. For typical message traffic between digital processing sender-receiver pairs in the network, an average sized message may be split into many smaller packets, and these packets are transmitted and then reassembled in the proper order at the receiving end. To keep track of the packets in such a transmission system, the packets are assigned sequence numbers at some point at the transmitting end, either by the host computer or sending terminal, or by a protocol processor downstream of the host. At the receiving end, the receiving processor keeps track of the sequence numbers and correlates incoming packet traffic by sequence numbers. The transfer system thus has to keep track of sequence numbers in a large number space (e.g., a 32-bit sequence number) so that it can track when the entire message has been transmitted and received or when packets are lost during transmission.

Traditional network transfers typically involved a single sender (server) transmitting a file to a single receiving client. This is referred to as a unicast transfer. One quickly evolving form of file transfer in the new Internet-based networks is that of multicast transfer. With a multicast transfer, a single server is able to send one copy of each packet simultaneously to a group (i.e., more than one) receiving clients. A multicast packet is a packet that is replicated and sent to multiple destination network ports. This replicated packet can be an exact duplicate of the same packet, a modified form of the original, or a combination of these.

The Trivial File Transfer Protocol (TFTP) is commonly utilized to support multicast transfer. TFTP is an Internet software utility simple transfer protocol utilized for transferring files. TFTP is utilized where user authentication and directory visibility are not required. When transferring data utilizing TFTP, the packet or block of data is sent utilizing the User Datagram Protocol (UDP) (rather than on the Transmission Control Protocol) and then the sender waits for an acknowledgment (ACK) from the receiving client. When an acknowledgment is received by the sender, the next packet/block of data is sent.

As a default with TFTP, the file is sent in fixed length blocks of 512 bytes. Each data packet contains one block of data. Receipt of a data packet of less than 512 bytes signals termination of a transfer. If a packet gets lost in the network, the intended recipient will time-out and may retransmit his last packet (which may be data or an acknowledgment), thus causing the sender of the lost packet to retransmit that lost packet. The sender has to keep just one packet on hand for retransmission, since the lock step guaranteed that all older packets have been received by the controlling client. The protocol's implementation of fixed length blocks make allocations straight forward, and the lock step acknowledgment provides flow control and eliminates the need for the controlling client to reorder incoming data packets.

When a network client wishes to initiate a multicast transmission, the receiving client sends a first request with the multicast option/tag to the expected sender (server client). The server returns an acknowledgment and then begins to transmit the packets in a sequential order. The first packet is transmitted and when received by the recipient client, the recipient client generates an ACK that is transmitted to the sender. Receipt of the ACK by the sender enables the sender to then transmit the next (second) packet. In a multicast environment, several clients may simultaneously listen in on a session and receive a copy of the packets being transmitted. Typically the first client to submit a request to begin transmission, referred to as the Master Client, is responsible for sending ACKs. The other clients may commence listening at any time during the transmission. Upon detection of a last packet (i.e., a packet with less than 512 bytes) or occurrence of a time-out while waiting to receive the next packet, a new master client will re-open the file transfer, request specific packets that are missing, and begin sending ACKs for the packets received until it has received all the packets. Any subsequent clients can start receiving blocks of a file during a transfer and then request any missing blocks when that client becomes the master client. Once the client no longer hears packets being transferred during a time-out period, the client re-opens the session and resumes the role of the new master client by requesting missed packets.

Thus, when transmitting a file in multicast, one receiving client operates as a controlling client or master. This is typically the client that issued the request to the sender to begin transferring the file. Any number of clients may simultaneously listen in on a transfer and receive a copy of the packet(s) being transmitted. Each client receives the packet, however, only the controlling client may send an ACK indicating the correct receipt of the packet. Thus, although the other clients are listening in, they are at the mercy of the control client. Each of the other clients may also start (and stop) listening in at a different time and thus may not receive all parts of an initial transmission. Additionally, if one of the other clients does not receive the packet, (the packet is lost) that client cannot immediately re-request the packet, because it is not the controlling client. That is, the time-out condition described above occurs only for the controlling client.

When the packet is received, the client tracks the packet utilizing the sequence number included within the packet's header. This information is utilized to place the packet in its correct location in the file space so that the receiving client can track when it has received all the packets of a file and reassemble the file. To accommodate the tracing operation, current client systems are provided a 64 Kbit tracking array within their memory subsystems. When a packet is received, the sequence number is read from the packet's header and the location in the array space corresponding to the packet's sequence number is set to indicate receipt of the specific packet (e.g., the bit is set to 1).

After the file transfer is completed for the controlling client, each empty space in the array (i.e., a space with bit value 0) of the other receiving clients indicates that the corresponding packet identified by the sequence number has not been received. The spaces may be as a result of the other clients beginning to listen in after the start of the transmission or ending their listening before the end of the transmission, or due to lost packets during transmission.

When the first controlling client ends his transmission, another receiving client then assumes the role of the controlling client and begins to request those packets that were not received as indicated by the holes in the array of the new controlling client. The controlling client thus has to re-request the transfer of only these packets by referencing the array to determine which sequence numbers are missing. Since only the controlling client may re-request transfer of packets not received, only packets lost by a current controlling client are re-requested, and the other receiving clients have to wait their turn to gain control of the transmission.

Traditionally, multicast network transmissions systems supported 64K packets. That is the total number of packets within a file was typically smaller than 64K and the sequence number for each packet ranged in value from 1 to 64K−1. Standard protocol operation provides that each packet carries 512 byte of a file content. Thus, each packet size is 512 bytes (half of a KByte) and the sequence number space within the header is 16 bits. Thus, the current networks can support transfer of a file up to 32 MBytes (and 500+ Mbyte file may be transmitted with lager block sizes). However, with today's increased utilization of file transfers and of proliferation of increasingly large files, e.g., image files, much larger than 32 MB, a need has developed to be able to transmit files in the Giga byte range. Creating larger packet sizes has been suggested to handle much larger files; however, many network routers can only handle a maximum transmission unit size of 1500 Mbytes. This forces the routers of the origination terminal to split the large packets into sub-packets prior to issuing them out to the network. These sub-packets are then rejoined at the destination terminals. This process causes performance degradation since the fragmenting and recombining of the packet requires additional processing, which takes time. Also, portions of each packet may be routed along different network paths and may arrive later than other portions or be lost during transmission.

Thus, in order to efficiently complete such a transfer without requiring the fragmentation and recombining of packets, a much larger number of packets, each having a unique sequence number, are required. To accommodate these larger number of packets the size of the packet identification (sequence) number within the packet header has been expanded from 16 bits to 32 bits. With a 32 bit identifier up to 4 billion or more packets can be uniquely identified.

For files that contain less than $2^{16}$ packets, the current 64 Kb array is large enough to accommodate the tracking of files that are less than 32 MB. However, with a file containing 4 billion packets, a 500 MB+ memory/storage space is required. This is inherently hardware, real estate and cost prohibitive.

In the original Intel PXE MTFTP SDK implementation, which supported a maximum of 16384 packets, each packet was tracked individually in an array of 2048 bytes, mt-pkg. In this implementation, the transfer identifiers (sequence numbers) utilized by software developers kit (SDK) of TFTP are between 0 and 65,535 (i.e., $2^{16}$−1 or 64 −1). With IBM LCCM MTFTP implementation, however, which introduces the 32-bit packet sequence numbers support for up to 4,294,967,296 packets is required. If the same mt-pkg scheme was utilized for these sequence numbers a 500 MB array would be required.

One approach proposed to the problem involves keeping track of the first packet received, the last packet received, and all packets missed in between up to a reasonable maximum (i.e., a threshold value). If the number of lost packets exceeds this maximum, then all data is thrown away and the transfer is restarted. This method becomes very tricky when multiple multicast clients all start listening in to a multicast at different points. For example, client 1 starts at packet 1, client 2 at packet 1000, client 3 at packet 10000, and client 4 at packet 12000. Assuming packet 14000 is the end of the file, client 4 receives packets 12000–14000, but misses packets 12200 and 12455. Thus, client 4 marks 12000 as its starting point and 14000 as its ending point and puts 12200 and 12455 into its missing array. If client 2 reopens the multicast and reads packets 1 to 999, then client 4 now marks 1 as its starting point but must add all packets between 1000 and 11999 to its array.

As is clear, this leads to a large number of "lost" packets within the array. However, the method then allows for switching to a range approach and having an array of ranges. Now, if client 3 reopens the transfer and requests packets 1000 to 9999, client 4 receives these packets and, to make sure the packets are not re-requested later, client 4 needs to adjust its missing packet range. This requires a sequential search of all lost packet range entries and/or maintenance of an ordered binary tree to find if a new packet falls in one of the ranges. If the number of packet range entries is large, this overhead can be prohibitive. If the number is small, then the tracking method is likely to surpass its maximum and forces client 4 to restart the transfer from scratch.

Another prior art approach is provided in U.S. Pat. No. 5,151,899, in which sliding windows are utilized with a hierarchical bitmap scheme. In this approach an algorithm is utilized which discards packets outside the sliding window. However, this hierarchical mapping scheme is static (i.e., limited to 32 packets per group) and does not address a fix for the large memory required for the hierarchical group map 2**32/32 addressing also does not address the basic problem of balancing memory usage and re-requests to the host.

In light of the foregoing, the present invention recognizes that it would be desirable to provide a method, system, and program product for efficiently tracking lost packets of a file being transferred on a multicast network to a receiving client where the tracking system is dynamically scalable to accommodate extremely large files. A method, system, and program product that enables the tracking of packets beyond the 64K sequential number without increasing the standard tracking array size would be a welcomed improvement. It would be further desirable if such tracking features could be dynamically completed while the transmission was in progress without requiring knowledge of the actual size of the file before transfer begins. These and other benefits are provided by the present invention.

SUMMARY OF THE INVENTION

Disclosed is a method and system for efficiently tracking lost data packets in a multicast TFTP network environment. An algorithm is encoded within the receiving client processing system that tracks received packets within a 64 Kbit tracking array. The array is stored in memory. If the number of packets of a file being transmitted is larger than 64K, the algorithm performs a grouping function, by which each set of two neighboring spaces within the array are combined. Combining of the spaces involves ANDing the spaces together, and the ANDed results stored within a single space indicates whether or not the packets within the group needs to be re-requested. Thus if either one of the values in the spaces is a zero (indicating that the corresponding packet is lost) then the combined space is tagged with a zero. In this way, when the client is determining which packet(s) or groups to re-request, the client checks the array for holes (i.e., 0's) and re-requests the packet(s) represented by each hole found.

The compression/combining of the spaces is completed dynamically, (i.e., after the file transfer has begun) and only when actually required to handle an overflow packet. Thus for example, if an N+1 packet is received during transmission, where N is the largest sequence number covered within the array's current tracking range, the values of the first and second array locations are grouped into the first location, the third and fourth are grouped into the second location, and so on. Additionally, whenever the 2N+1 packet is received, the algorithm automatically compresses/combines the groups as described above similarly to the packets. In this manner, any number of packets may be represented by the 64 Kbit array and extensive memory requirements for storing sequential packet data are substantially eliminated.

Obvious benefits of the invention includes tracking large files without incurring additional cost in hardware or space to support huge memory arrays. Also, the number of re-requests to the network is minimized while balancing against the amount of memory used to track the packets. Additionally, the packet tracking occurs dynamically and in a seamless manner at the receiver end as the transmission is underway. There is no requirement that the number of packets be known prior to the start of the transmission to configure the array or the receiving algorithm.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
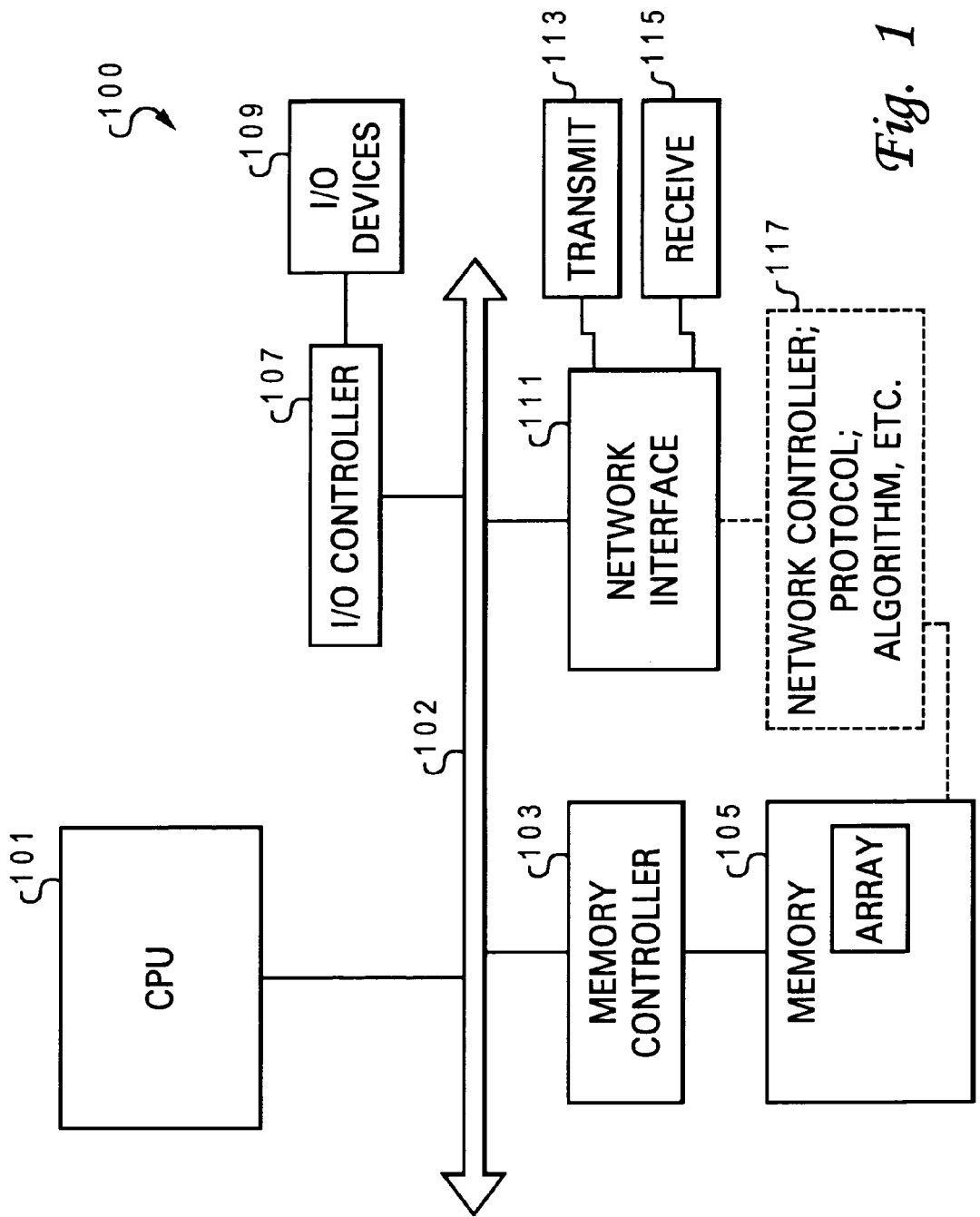
FIG. 1 illustrates the basic component parts of a data processing system that may be utilized as a receiving client or sender/server in carrying out the preferred embodiment of the present invention.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

With reference now to the figures and in particular FIG. 1, there is illustrated a data processing system within which the various features of the invention may be implemented. Data processing system 100 comprises several major components including processor (CPU) 101, memory 105, I/O devices 109, and network interface 111. These major components are generally interconnected via system bus 102. Memory 105 is connected to the other components through memory controller 103 and, likewise, I/O devices 109 are connected through I/O controller 107. As illustrated, network interface 111 includes two ports, transmit port 113 and receive port 115, which provide the hardware and logic required for the physical connection to an external network. Transmit port 113 and receive port 115 respectively transmit and receive data packets and ACKs during multicast file transmission as further described below. Thus, these components enable data processing system 100 to operate either as the source or the destination of the messages/files transmitted within an interconnected network. Although illustrated with specific components in a particular configuration, the present invention may be implemented within other systems, which may not be standard data processing systems and/or other data processing systems comprising different/additional components and configurations.

To enable proper network communication, data processing system 100 typically includes a network controller 117 (i.e., an adapter or other facility) for executing the network protocol. In some cases the protocol can be executed on the host computer itself, but this task may be offloaded to a protocol processor. According to the preferred embodiment, a Trivial File Transfer Protocol (TFTP) is utilized within data processing system and the network (described below) to enable transmission of data packets, ACKs, etc.

Figure 2A:
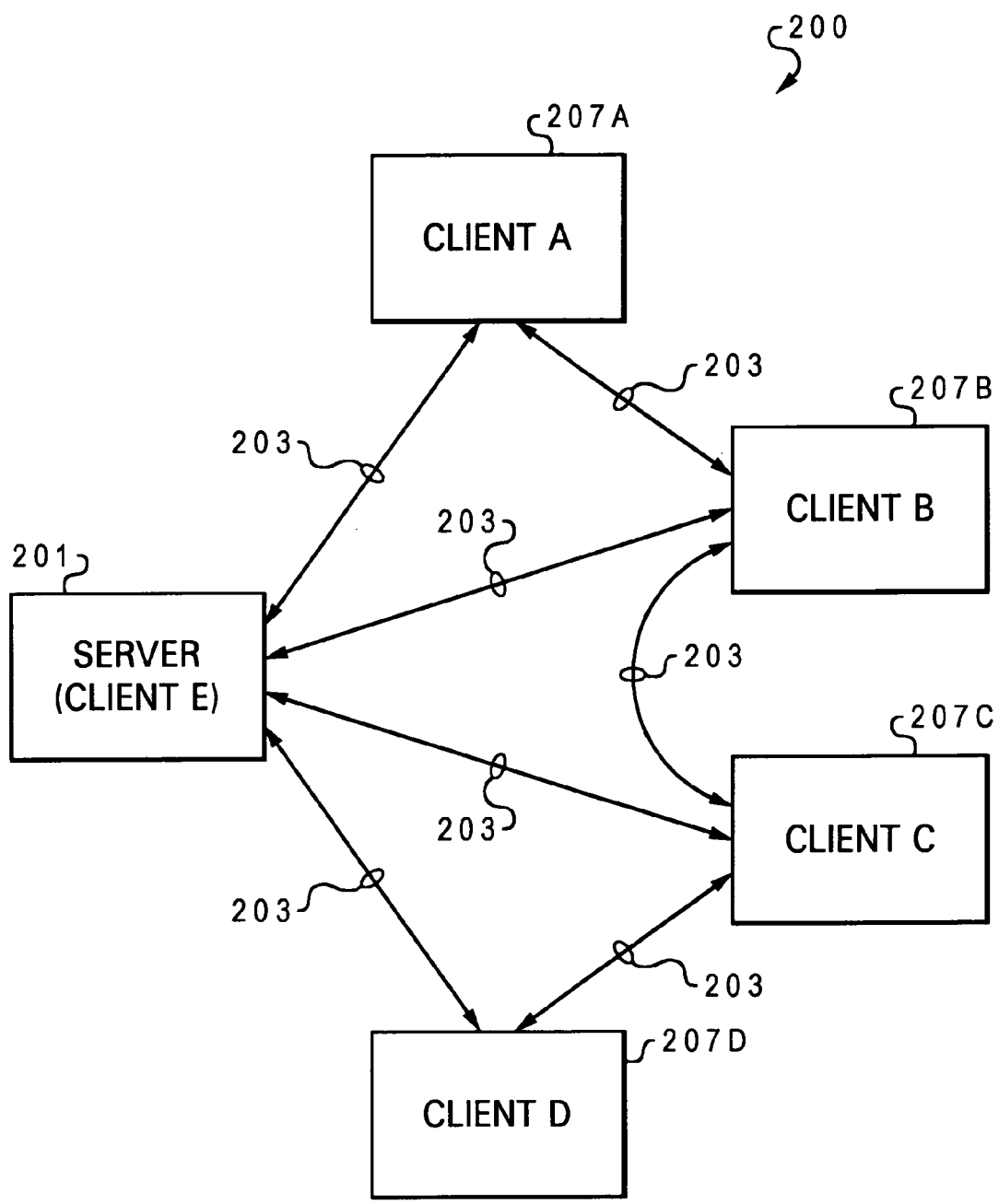
FIGS. 2A and 2B illustrate two representations of a network topology in which multicast transmission may be implemented according to a preferred embodiment of the present invention.
Figure 2B:
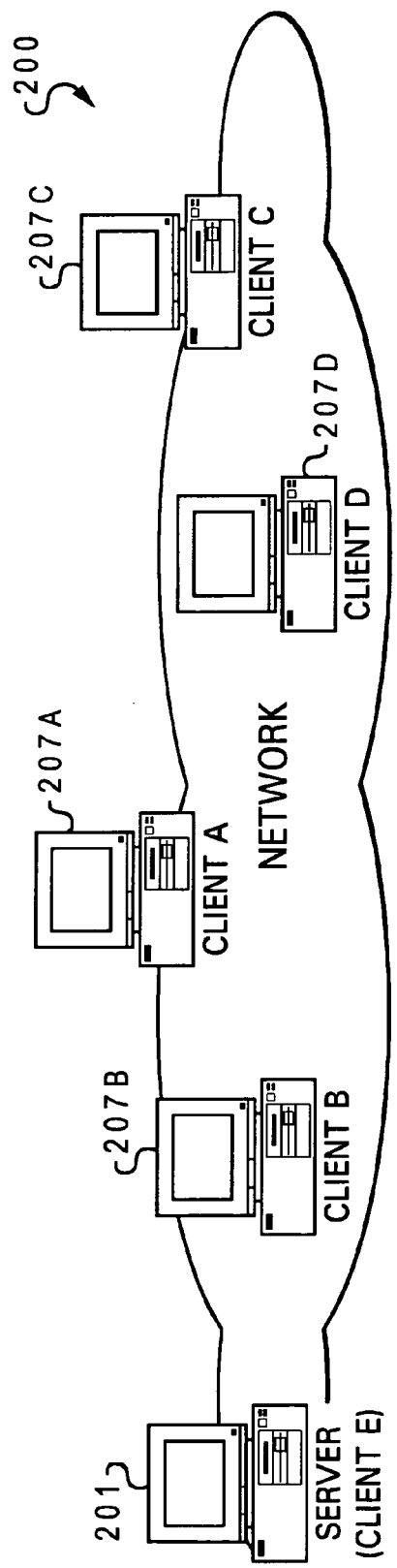

FIGS. 2A and 2B illustrate two configurations of network 200 within which the communication (i.e., data transmission) that utilizes the features of the invention occur. Network is illustrated having a sender/server 201, which is interconnected to Clients 207A–207D via network links 203. Server 201 and clients 207A–207D may each comprise data processing system 100 or a similar hardware configured system that executes the various processes provided by the invention during receipt of packages of a file. Each server and/or client includes the hardware and software required to complete network transmissions via file transfer protocol and multicast data packet transfer. The transfer of data over the network is completed utilizing a network protocol, which in the preferred embodiment is a trivial file transfer protocol (TFTP). According to the preferred embodiment of the invention, network 200 operates as a multicast environment that supports data transfer via TFTP.

For illustration, when describing a multicast transmission herein, server 201 is assumed to be the sender/originator of the data packets and clients 207A–207D are assumed to be the recipients of the data packets. Of course, receipt of the data packets may occur simultaneously, with any one of the receiving clients operating as the master (i.e., the client that requests the transmission and which is responsible for sending ACKs in response to receipt of each packet) according to multicast TFTP transfer guidelines. In the illustrated multicast network, server 201 is a similar processing system to the other clients 207A–207D, and can therefore operate as a receiver of data packets from another one of the clients, which then assumes the role of the server (i.e., sender).

In FIG. 2A, the client systems 207A–207D are illustrated interconnected via links 203. Although illustrated as single, point-to-point connections, these links 203 may include a number of links connecting intermediate nodes, and some of these links 203 may ordinarily be trunk facilities, capable of simultaneous or time-multiplexed transmission of hundreds or thousands of separate channels or messages. Links 203 may comprise microwave or satellite link, or fibre optic link, as well as conventional wiring. Network 200 may be a local network or may be a geographically dispersed network spanning hundreds or thousands of miles.

Also, in the communications network 200, alternative paths may exist between clients (server and clients) for a packet sent from server 201 to clients 207A–207D, so that packets of a given file may be routed from server 201 to receiving clients 207A–207D by different routes. As is typically the case, network traffic is routed by paths having available bandwidth, according to the level of congestion existing from moment to moment within various links in the network. Thus, a message having a number of packets may have packets routed by diverse links 203, and some packets may never arrive at the destination client (i.e., packets get lost).

The message packets could be of various formats, depending upon the protocol being executed and the transport mechanism. According to TFTP, each 512 byte packet has a header comprising a unique sequence number (ranging from 1 to $2^{32-1}$ in the preferred embodiment) selected by a processor at the sending/transmitting end (e.g., server 201), identifying this packet as to its position in a file. For example, if the complete message is 32 KBytes, and each packet carries 512 bytes in its data field, then sixty-five packets numbered 1 through 65 are generated to transmit the file.

Figure 3A:
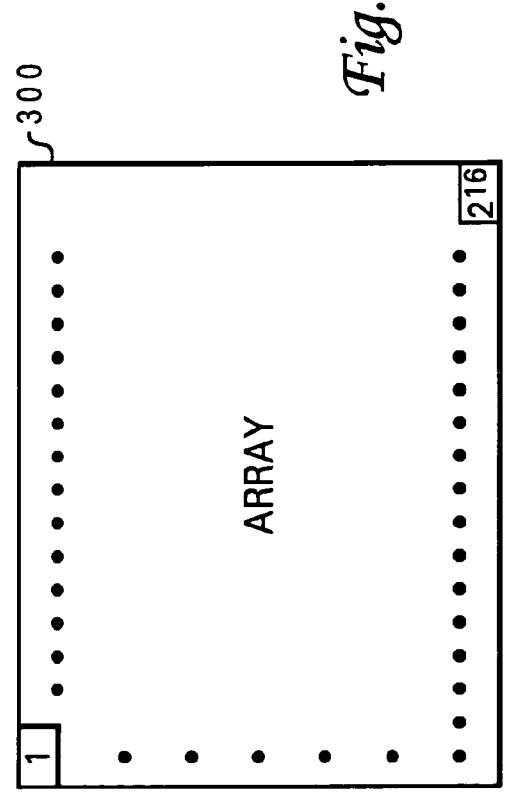
FIG. 3A illustrates a sample 64 Kbit array, which may be utilized in one implementation of the present invention.

According to the illustrative embodiment, an array is utilized to track the 32-bit sequence numbers within a 32-bit header field, and therefore the array spaces required increases sequentially from 1 to 216 (or zero to 216−1). FIG. 3A illustrates a sample array, which may be utilized to track incoming packets. Array 300 comprises 64K spaces, number 1 to 216. Each space is able to store a single bit value of 1 or 0. According to an illustrative embodiment, a "1" indicates that the packet (or packets as described below) have transmitted correctly to the receiver. A "0" indicates that the packet did not transmit correctly, i.e., it was lost during transmission, was never received, or has an error causing it to show up as missing (in advanced systems). 300 is stored within memory of the receiving client (e.g., clients 207A–207D). The values within array are set by the network controllers (or processors) 117 of each client. For example, when a packet is received, the network controller 117 queries the packet for its sequence number, and locates the position/space within the array corresponding to the sequence number. The position/space is tagged (i.e., value set to 1) to indicate that the packet has been received. According to the illustrative embodiment, the invention processes reset the entire array to reflect all 0s prior to or on receipt of the first packet of a transmission.

The present invention provides a method and system for tracking packets whose sequence number is larger than $2^{16}$, including packets with sequence numbers as large a 64K*64K without requiring any significant increases in hardware needs and/or costs. The array is stored in the system memory and the various processes are implemented in the processor of the client system and completes the sequence number tracking utilizing the standard array size. Specifically, the invention provides program code (or an algorithm) executed by the processor of the receiving client (e.g., one of clients 207A–207D) during the packet transmission. The illustrative embodiment of the invention enables tracking of up to 64K "groups" of packets, where a "group" can be anywhere from a single packet to 64K packets, and the group size is adjusted dynamically. The particular size of the group denotes the minimum granularity required to recover a lost packet. That is, if a packet is lost or dropped within a group, the whole group must be re-requested by the receiver and re-transmitted by the sender. For this reason, the group size is kept at the smallest possible value and is only incremented when necessary to support additional packets beyond the range (sequence number) which the previous group size can support.

Thus, in the preferred embodiment, the group size starts out at 1 (i.e., single packets per group), and with this group size all packets sequenced 1 through 65536 may be tracked as conventionally done with a 64 Kbit tracking array. However, if packet 65537 is then received, the 64 Kbit array can no longer allocate an individual space for that packet (and subsequent packets). Accordingly, the Array Tracking Compression Algorithm (ATCA) (i) determines that the received packet cannot be tracked with the current single packets allocation, (ii) changes the group size to 2, and (iii) initiates a compression routine that compresses the tracking information accordingly for 2-packet groups. Thus, packets 1 and 2, formerly allocated as groups 1 and 2, are combined to be group 1. Similarly, packets 3 and 4 are combined to be group 2, and so on. If, however, either packet was not received (i.e., one of the corresponding array locations has a 0 value), then the new combined group is marked as not received (i.e., value set to 0). ATCA then (iv) allocates the packet to a group and continues to track packets received within the new combined groups.

Figure 3B:
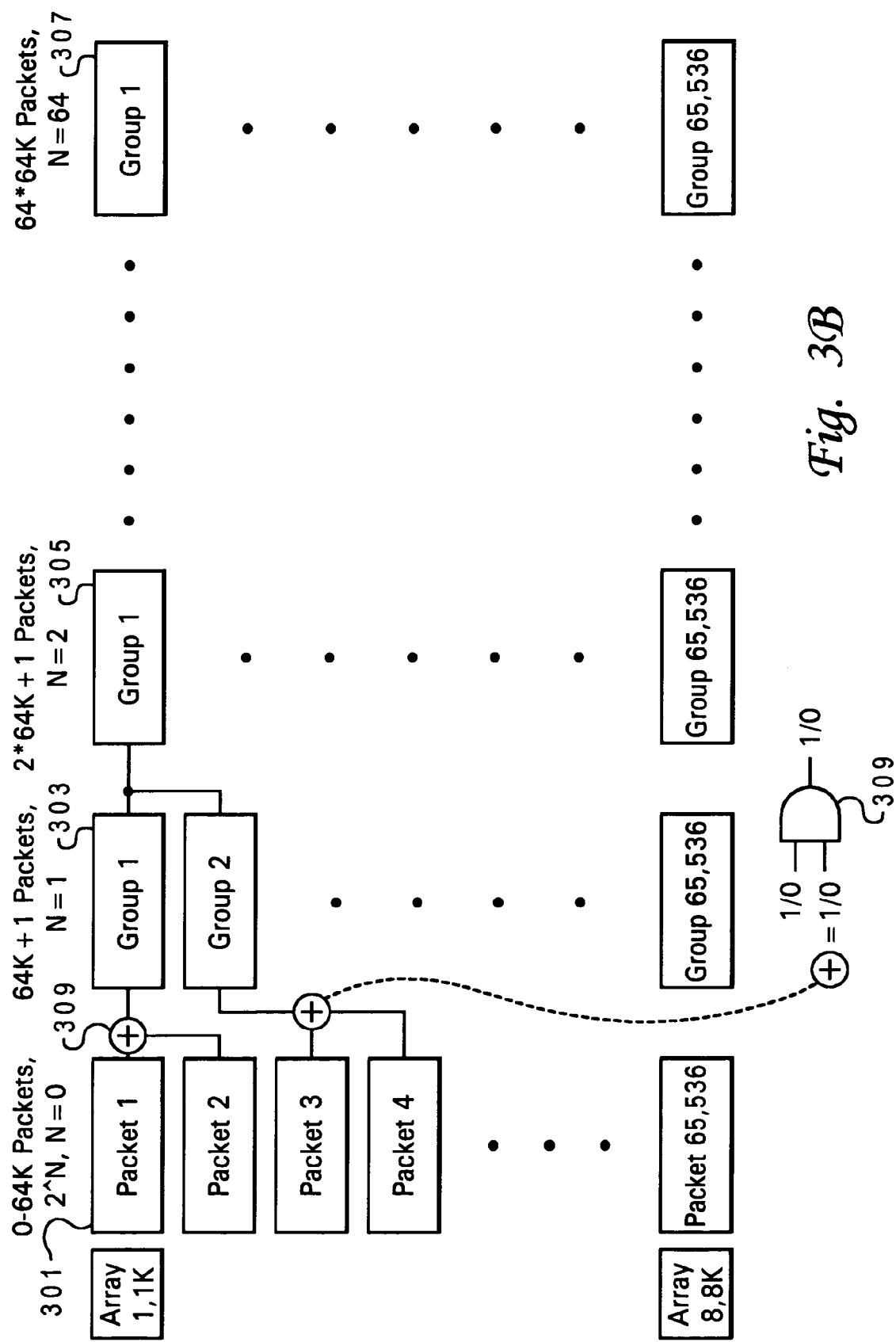
FIG. 3B illustrates various stages of packet grouping within a 64 Kbit array as the number of packets increase in accordance with an illustrative embodiment of the present invention.

FIG. 3B generally illustrates the different groupings of packets 301 available under ATCA according to the preferred implementation of the invention. Column 1 indicates packet sized groups for packets 1 to $2^{16}$ (i.e., group size=$2^0$). Each array location has a corresponding sequence number. After the first grouping/compression is triggered, the values within the location for packet's 1 and 2 are combined as indicated by the transition from column 1 to column 2. Combination of the values includes ANDing the current values and storing the result of the operation in the new group position. The ANDing operation is a logic operation which may be carried out by hardware processor logic such as adder 309 or by software code. Once the results of the first combine operation is completed, the value is stored in the first array space 303 to represent group 1. Likewise, when the last array is taken for the 2-packet groups, the first two 2-packet groups are combined into the first array space 305 to represent the new group 1. Thus, the array space 305 actually comprises combined information about the receipt of all first four packets transmitted. The value of array space 307 is set to 1 if all of the 4 initial spaces (representing packets 1 to 4) were set to 1, and array space 307 is set to 0 if any one of the four initial space held a 0 value. Similarly, the value of array space 307 is set to 1 if all of the 64 initial spaces (representing packets 1 to 64) were set to 1, and array space 307 is set to 0 if any one of the 64 initial spaces held a 0 value.

Figure 4A:
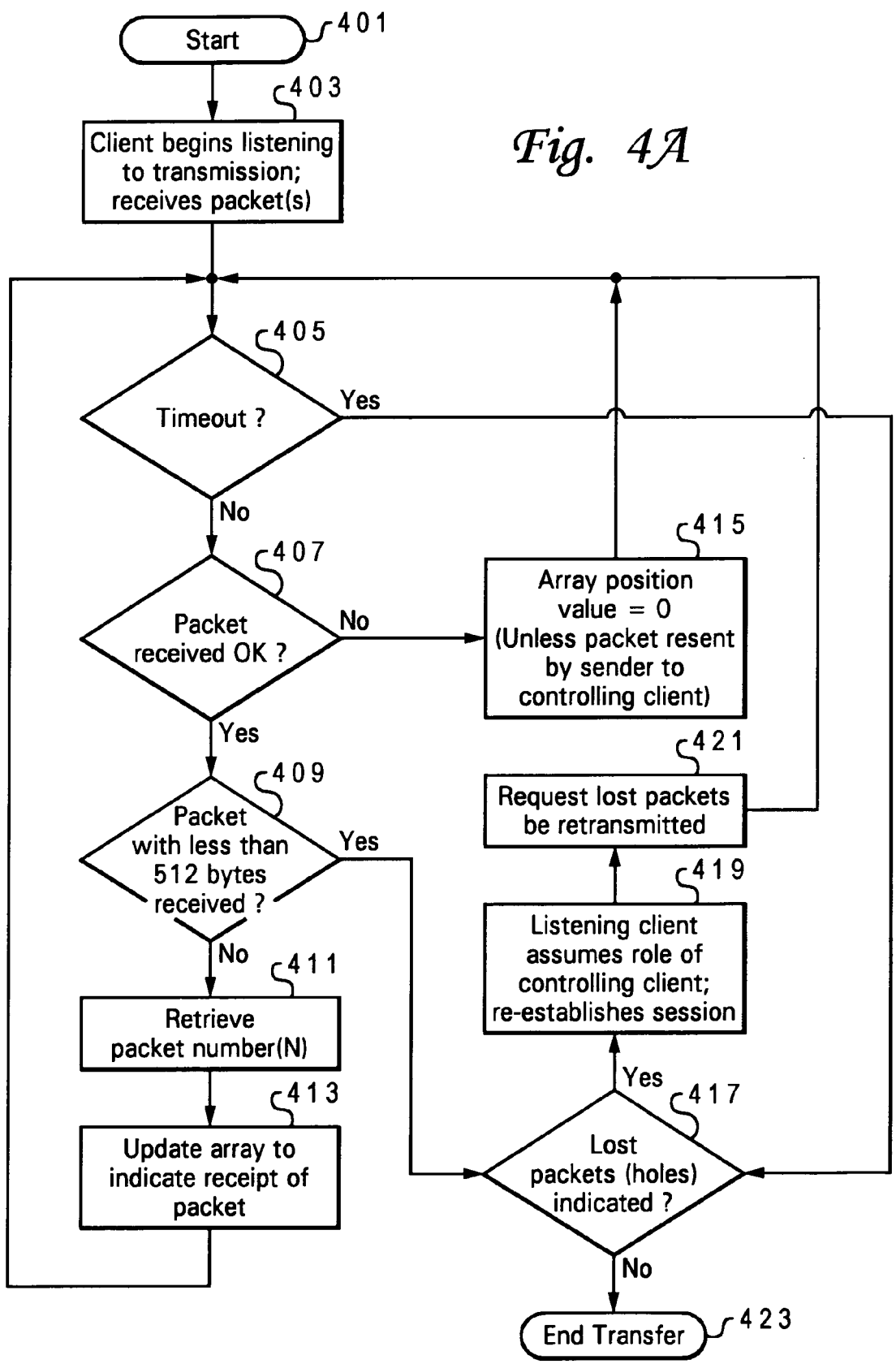
FIG. 4A is a flow chart illustrating the process by which the tracking algorithm implements the grouping and allocating of array spaces to accommodate tracking the sequence numbers of the packet received in accordance with an illustrative embodiment of the present invention.

FIG. 4A is a flow chart of the process by which a packet is received within the array of a listening client. The process is described as a single packet arriving at a time, however, as provided within the description of FIG. 4B below, the invention contemplates arrival of multiple packets together and assigning these packets to respective groups. The process begins at block 401 and thereafter proceeds to block 403, at which the listening client opens a connection to a multicast transmission to and begins receiving packets being transmitted because of a request by a controlling client. A determination is made at block 405 whether a timeout occurs before a packet (or next packet is received). If a timeout occurs, then the session opened by the controlling client has terminated and the listening client has to decide whether or not to re-open the session, as described below. Following, a determination is made at block 407, whether the packet was received at the listening client. If the packet is received, a determination is made whether the packet contains less than 512 bytes as shown at block 409. If the packet contains its full 512 bytes, the sequence number of the packet is read as shown at block 411, and the corresponding array position is set (i.e., value =1) to indicate receipt of the packet as shown at block 413.

If however, the packet is not received by the listening client, the array position is not set (i.e., value=0) as shown at block 415. In some instances, the transmitted packet is not received by both the controlling client and the listening client, and the sender re-transmits the packet when it fails to receive an ACK from the controlling client within a set time period. Thus, it is possible for the packet to still be received by the listening client and the corresponding array position to be set. However, if the packet is received by the controlling client, but not received by the listening client, the corresponding array position in the listening client is never set and the client waits for receipt of the next packet.

Returning to decision block 409, when a packet containing less than 512 bytes is received, that indicates to the listening client that the transmission of the file to the controlling client is ended. (Typically, the end of a transfer is marked by a data packet that contains between 0 and 511 bytes (i.e., less than 512 bytes) of data. The controlling client relinquishes control of the transmission to the listening client. Once the controlling client terminates its transmission, the listening client determines whether there are missing packets indicated within its array (i.e., it looks for holes) as shown at block 417. If there are no missing packets indicated, the transfer to the listening client ends as shown at block 423. If however, there are missing packets indicated, the listening client re-opens the session with the sender as indicated at block 419 and re-requests those packets which are missing as depicted at block 421.

Figure 4B:
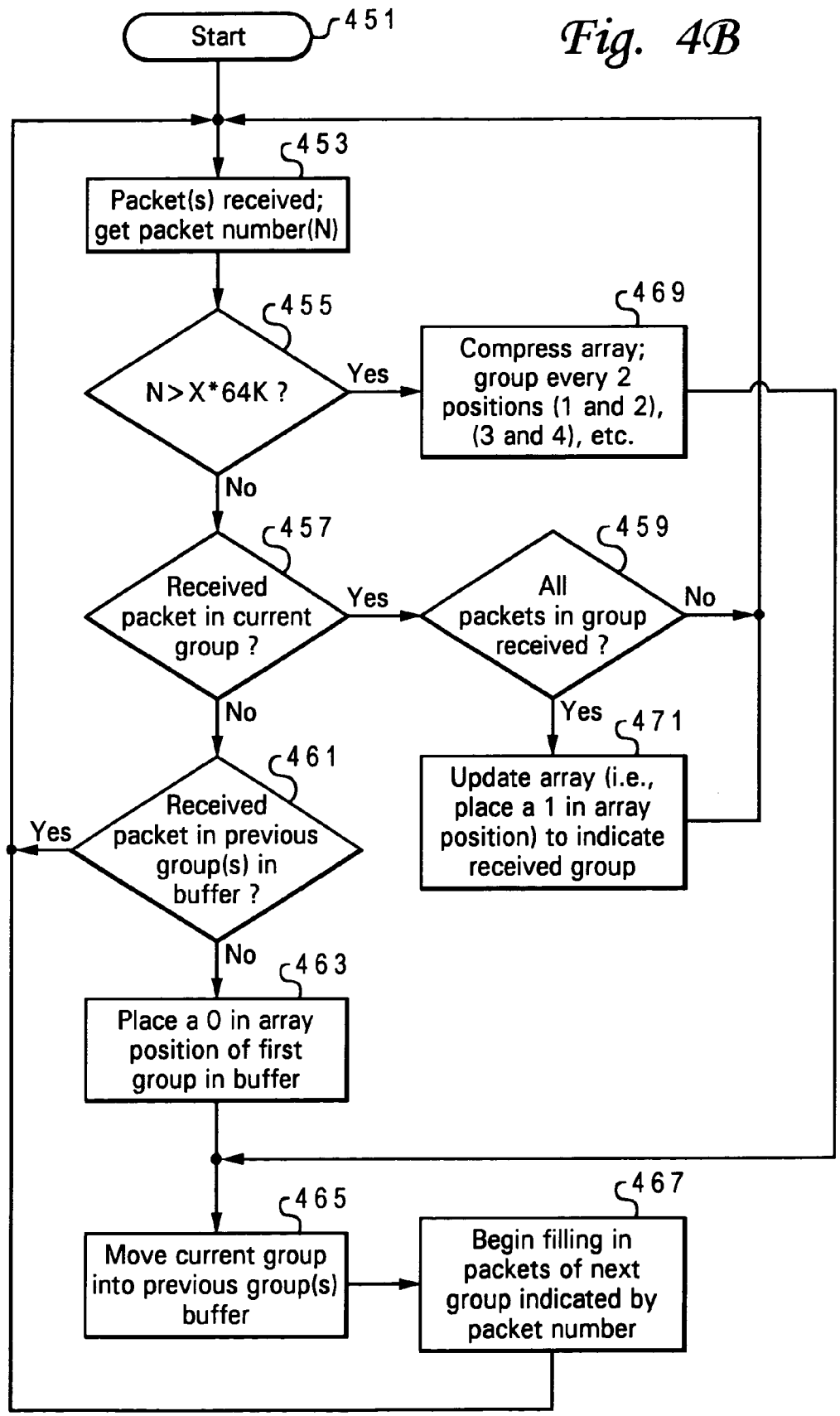
FIG. 4B is a flow chart illustrating the process by which the tracking algorithm monitors the received packets within groups and assigns values to the array spaces in accordance with an illustrative embodiment of the present invention.

FIG. 4B illustrates the process by which received packets are grouped in accordance with one implementation of the invention. For simplicity, the present example is described with reference to a 64 Kbit array having $2^{16}$ numbered spaces. The illustration assumes simultaneous (or near simultaneous receipt) of multiple packets, which may belong to two or more sequential groups being filled. Also, the tracking process is described for concurrent/sequential group analysis of a current and previous group that are held in a buffer associated with ATCA until all packets within each respective group is received.

With reference now to FIG. 4B, the process begins at block 451 and proceeds to block 453, which indicates receipt of the packets and retrieval of the corresponding packet number of each packet. After the packet's sequence number is read, a determination is made at block 455 whether the sequence number exceeds a threshold value corresponding to the range of numbers that can presently be accommodated within the array. If the packets sequence number does not exceed $X*2^{16}$, where X represents the group size, then the tracking algorithm determines at block 457 if the received packet is in the current group (being tracked in the buffer). If the received packet is in the current group, a next determination is made at block 459 whether all the packets in the group have been received. When all the packets in the group have been received, the array is updated to indicate that the group has been received as shown at block 471.

Returning to decision block 457, if the packet is not in the current group, the tracking algorithm determines at block 461 whether the packet belongs to (one of) the previous group(s) being tracked in the buffer. The actual number of groups being tracked is variable depending on the amount of available buffer space, the complexity desired by the client manager, and the group size, etc. The number may be a parameter that may be set during activation of the client for network transmission. If the packet does not belong to one of the previous groups, a 0 is placed in the array position of the first group within the buffer as shown at block 463. Following, the current group is tagged as a (most recent) previous group as indicated at block 465. A next group is made the current group and begins tracking the next group of packets as shown at block 467. Of course, the current implementation assumes that the buffer operates as a First In First Out (FIFO) buffer with respect to groups being tracked.

Returning now to decision block 455, if the packet's sequence number exceeds $X*2^{16}$, where X represents the group size, the ATCA compresses the array by grouping the spaces in multiples of twos as indicated at block 469. Then, the tracking of the next group of packets commences from the new array location (presumably the mid point of the array with a 2-to-1 compression scheme).

When transmission first begins, the packets are tracked individually and thus tracking previous groups does not require buffering the array values. Once the packet is received, irrespective of the order, the array position is tagged to indicate the receipt of the packet. However, once the first packet greater than $2^{16}$ is received, the ATCA switches modes from tracking individual packets to tracking groups of received packets and the buffering function is activated. Updating the array requires "combining" the value to be allocated to the new packet with the value(s) of the other packets within the group, which may be previously received or received after the new packet. When the new packet is the first packet in a group to be received, a buffered space may be provided to temporarily hold the value for the group (corresponding to the receipt of the first packet) until all packets within the group arrives. Additionally, the ATCA may compress the space with an adjacent space to create a new group.

In another embodiment, group values are tracked within the array themselves, each sequence number of the incoming group of packets is stored in a buffer and checked off as the packets arrive. After all the packets are checked off a 1 is placed in the group space. Otherwise, if a packet not belonging to the group is received while checking packets for the group, ATCA assumes that the other packets within the group are lost and places a 0 in the array space.

If a packet containing less than 512 bytes is received as described above in FIG. 4A, the tracking and compression processes end as well as packet transmission and a check is made for holes (0s) in the array. Occurrence of holes indicates that some packets were lost or never received during transmission. Notably, the hole may actually represent that a single packet from within a group of packets was lost according to the established rules for ATCA. If there are no holes, then all the packets were successfully transmitted and the transfer process ends. If however, there are holes, then the client re-requests transfer of the specific packets missing as indicated by the holes. When the holes represent a group of packets, the re-request is for each packet within the group (i.e., not just for the actual packets that were not received). After the re-request is completed, the transmission process ends and the client stops listening on the network.

Implementation of ATCA requires use of the memory of the processing system and, in one embodiment, a buffer, which may be a small space within memory. The buffer is utilized to hold temporary values of the array when the compression is taking place. The buffer may also be utilized to hold values of the group receiving a new packet. In this manner, the array is updated only after or when all packets of the group are actually received. The array defaults to zero at the beginning of the reception of the packets. In this way, the array space only changes when the packets or groups of packets are actually received. Also, when the last packet is received, ATCA marks the terminal array space so that it is aware of which spaces at the end of the array were never allocated during transmission. Checking for holes within the array is completed only within the section of the array before the terminal array space.

Figure 5:
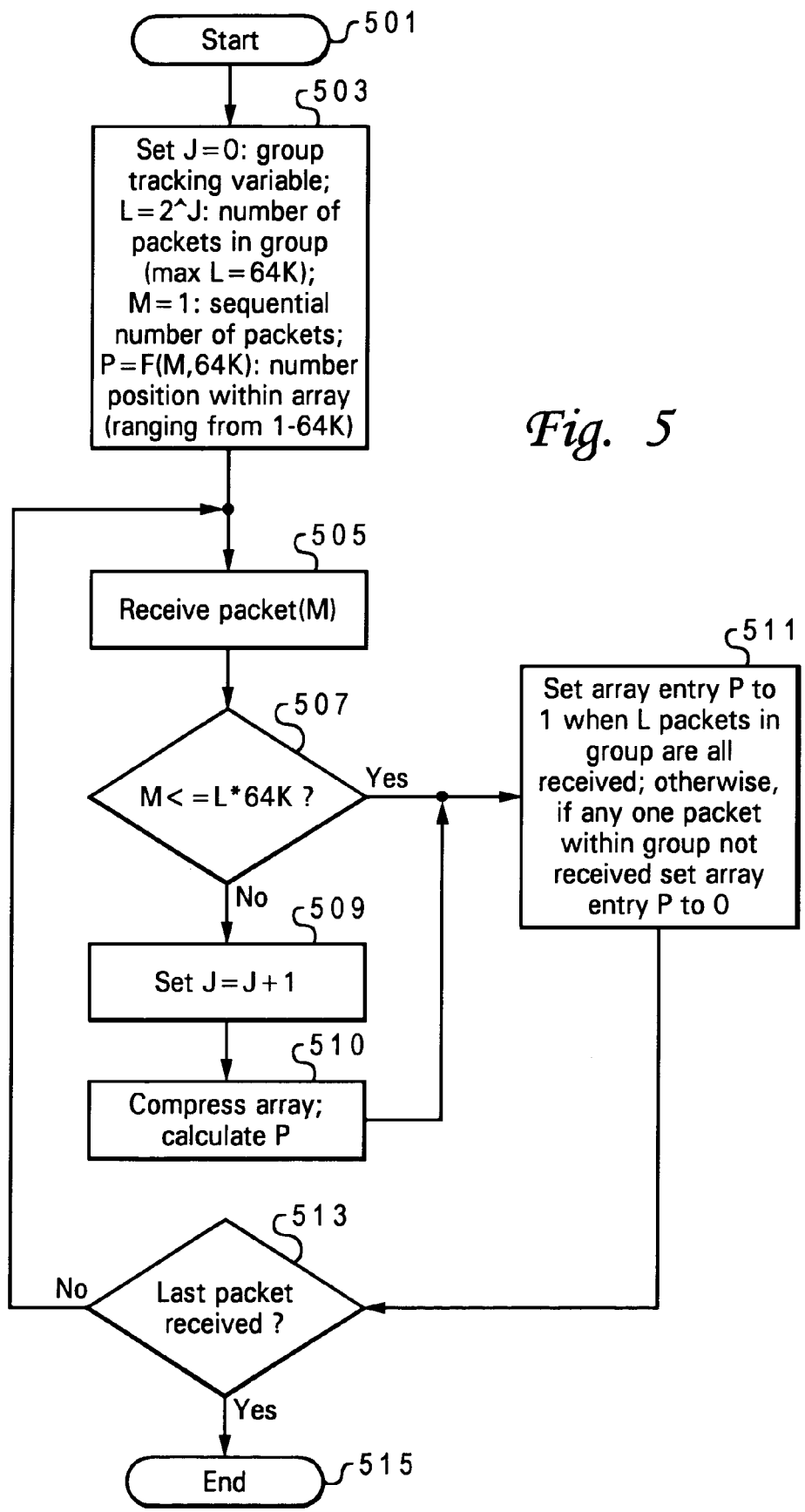
FIG. 5 is a logic flow diagram of an algorithm utilized to determine when to group packets within an array and to which group to allocate a received packet in accordance with an illustrative embodiment of the present invention.

Processing logic required for implementing the invention is illustrated within the logical flow diagram of FIG. 5. Although, the actual compression routine and space allocation algorithm are not specifically shown. As illustrated, the process begins at block 501, and proceeds to block 503, which indicates the defining of variables utilized by ATCA and the initializing of these variables. Notably, the actual allocation of memory spaces is indicated as a function (F), which takes as its operands, the sequence number of the packet, M, and the size of the array, N. Thus, although the invention is described herein with reference to a specific size of array, the processes described herein may be extended to any size tracking array. Further, additional and/or different processing steps may be utilized to complete the processes of ATCA, and the logic processes provided herein are done so only for illustrative purposes.

Returning to FIG. 5, after the variables are initialized, a packet is received with a sequence number (M) as indicated at block 505. The ATCA determines at block 507 whether the value of M is less than or equal to the current maximum value allowed within the range of spaces being allocated. That is, for single packet groups, less than $2^{16}$ and for 2 packet groups, less than $2^{17}$, etc. If M is less than or equal to the current maximum value, then the array entry is set accordingly as shown at block 511. The array entry is set to 1 when all packets within the group are received and 0 if any packet within the group is not received. Any number of ways may be implemented to track the packets within the groups to determine which value to place in the array. However, according to the preferred embodiment, the initial group value is set to 0, when the first packet in the group is received, and the group value is then changed to 1 if all subsequent packets within the group are received.

One manner of completing this implementation is by performing a global flush (or reset) of the array spaces past the mid-point of the array after the compression. Of course, for the initial packets numbered less than $2^{16}$, the array is first initialized to all zeros so no flush is required of any of the array spaces. Flushing only past the mid-point is performed because, according to the preferred embodiment, the compression performs a 2 to 1 compression leaving only the top half (i.e., space 1 to $2^{15}$) of the array spaces with important tracking information.

If the M value is greater than the maximum value allowed, then the variables (e.g., J) are updated, as shown at block 509. Then, the array is compressed and the position within the compressed array for indicating the received packet is calculated utilizing the function (F) as shown at block 510. Following the placement of the value within the array, a determination is made at block 513 whether the last packet in the file was received and whether transfer of the entire file was completed (by checking the array for holes as described above). When the last packet has been received, the ATCA processes terminate for that client as shown at block 515.

Calculation of the actual position within the array of the group may be completed in a number of ways and may include a set of parameters. For illustration and as utilized within the attached claims, various parameters are identified including:

(1) a compression tracking parameter, L, which indicates the number of times the array has been compressed and is thus increased by 1 after each subsequent compression;

(2) a packet sequence number, M, assigned at the origination node of the communication;

(3) the number of spaces within the array, N; and (4) the group size, i.e., number of packets in a group, G.

These variables are then utilized by the ATCA and other algorithms to determine when the array needs to be compressed, when the packets for each group have been received, and which value (1 or 0) to place in the array spaces. Of course, any nomenclature may be utilized to define each term, and the calculations may be completed without the utilization of uniquely named variables. Thus, any calculation method that results in correct tracing of packets and packet groups in an array with limited space fall within the general coverage of the invention.

According to the preferred embodiment, group sizes always increase by a power of 2. Thus, the maximum file size required for group sizes up to 2048 packets for both a transfer block size of 512 and 8192 are calculated and illustrated in the following table.

| Group Size | Max. File Size (block size 512) | Max. File Size (block size 8192) |
| --- | --- | --- |
| 1 | 32M | 512M |
| 2 | 64M | 1G |
| 4 | 128M | 2G |
| 8 | 256M | 4G |
| 16 | 512M | 8G |
| 32 | 1G | 16G |
| 64 | 2G | 32G |
| 128 | 4G | 64G |
| 256 | 8G | 128G |
| 515 | 16G | 256G |
| 1024 | 32G | 512G |
| 2048 | 64G | 1T |

With the functionality provided by ATCA, the cost and hardware overhead in re-requesting packets that are already received because of a lost packet is minimized, while still utilizing a simple array method. This performance benefit takes into account that the re-request is for at most 1/32768 of the total data being transferred. The "group" provided by ATCA thus offers more simplicity and higher performance than the alternate approaches provided.

Of course, although the illustrative embodiment has been described with reference to a group size that increases as a multiple of two, the features of the invention may be extended to different increments in group sizes. For example, a group size of three (3) packets may be utilized in an alternate embodiment in which the total number of array positions is a multiple of 3.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although described with reference to a 64 Kbit array, the features of the invention may be extended to any size array, given the need to balance available memory/hardware and costs with the need to most efficiently track lost or missing packets and re-request them. Also, although the invention is described with a specific protocol and communication network, the features of the invention may be extended to other communication protocols and networks, which may also share similarities with regards to the need to track missing packets or file modules, etc. It is therefore contemplated that such modifications can be made without departing from the spirit or scope of the present invention as defined in the appended claims.

What is claimed is:

1. A system for tracking missing packets at a receiving terminal of a network transmission comprising:
  processing logic;
  a memory in which incoming packets and a tracking array are stored;
  means for determining a maximum number N, corresponding to the number of sequentially numbered spaces within said tracking array utilized for tracking said incoming packets;
  means for receiving an incoming packet and identifying a sequence number, M, of said incoming packet;
  means, responsive to receipt of a packet with sequence number, M, that is greater than a current maximum number that may be tracked by said tracking array, for compressing spaces within said tracking array in multiples of X, where X is an integer, and N is a multiple of X, to create an array of N group values, wherein each group value indicates whether or not each packet within a particular group of packets assigned to a particular array space was received, wherein a number of packets within said particular group is initially 1 and increases by a factor of X after each compression; and
  means for setting a value of said particular array space of said tracking array to a first value indicating receipt of all packets within said particular group of packets, wherein said value is set to a second value when all of said packets within said particular group of packets have not been received.

2. The system of claim 1, further comprising:
  means, responsive to a receipt of a final packet of a file being transmitted, for checking said array for occurrence of holes, each hole representing that at least one packet within a group was not received; and
  means for issuing a request for each packet within a group whose array space contains a hole, wherein an entire group is re-requested when said hole is found.

3. The system of claim 1, wherein:
  Y packets are received at a time by said receiving terminal, where Y is an integer with value greater than 1, and said Y packets may be received out of sequential order with respect to each other
  said system further comprising:
  means for tracking each packet in a buffered storage area comprising a current group and at least one previous group, wherein each of said received packets are sorted into their respective groups before a received status of a group corresponding to the received packets is recorded within the array.

4. The system of claim 3, wherein said tracking means further comprises:
  means, responsive to a packet being in said at least one previous group or said current group, for respectively updating a status of said previous group or said current group within said buffer.

5. The system of claim 4, wherein, responsive to all packets of a group being received, said system further comprises:
  means for updating a received status of said group within said array to indicate receipt of said group; and
  means for moving said group out of said buffer.

6. The system of claim 5, wherein said group is a previous group, said system further comprising:
  means for identifying said current group as a previous group, wherein a next group is selected as the current group; and
  means, when a final packet has not been received, for subsequently tracking packets for said next current group within said buffer.

7. The system of claim 5, wherein said updating step further comprises:
  means, responsive to a receipt of a new packet not within said current group or said at least one previous group, for moving a first created previous group out of said buffer; and
  means for updating a received status of said first created previous group within said array to indicate non-receipt of each packet of said first created previous group.

8. The system of claim 7, wherein N is a multiple of 2, X is 2 and L is the number of packets in a current group, said system further comprising means for determining a group space, P, of a received packet by dividing said sequence number, M, of said packet by L, wherein a sum of a resulting quotient of said division+1 indicates the group space within the array and a remainder of said division indicates the position of the received packet within the particular group.

9. The system of claim 1, said compression means further comprising means for ANDing each value within X adjacent spaces of said array to create a first set of group values stored within a first section of said array, wherein a second set of group values are determined when packets within subsequent groups are received after the compression and stored in a second section of said array.

10. A computer program product comprising:
a tangible computer readable medium; and
program code on said computer readable medium for tracking missing packets at a receiving terminal of a network transmission, said program code including code for:
determining a maximum number N, corresponding to the number of sequentially numbered spaces within said tracking array utilized for tracking said incoming packets;
receiving an incoming packet and identifying a sequence number, M, of said incoming packet;
responsive to receipt of a packet with sequence number, M, that is greater than a current maximum number that may be tracked by said tracking array, compressing spaces within said tracking array in multiples of X, where X is an integer, and N is a multiple of X, to create an array of N group values, wherein each group value indicates whether or not each packet within a particular group of packets assigned to a particular array space was received, wherein a number of packets within said particular group is initially 1 and increases by a factor of X after each compression; and
setting a value of said particular array space of said tracking array to a first value indicating receipt of all packets within said particular group of packets, wherein said value is set to a second value when all of said packets within said particular group of packets have not been received.

11. The computer program product of claim 10, further comprising program code for:
responsive to a receipt of a final packet of a file being transmitted, checking said array for occurrence of holes, each hole representing that at least one packet within a group was not received; and
issuing a request for each packet within a group whose array space contains a hole, wherein an entire group is re-requested when said hole is found.

12. The computer program product of claim 10, wherein:
Y packets are received at a time by said receiving terminal, where Y is an integer with value greater than 1, and said Y packets may be received out of sequential order with respect to each other;
said computer program product further comprising program code for:
tracking each packet in a buffered storage area comprising a current group and at least one previous group, wherein each of said received packets are sorted into their respective groups before a received status of a group corresponding to the received packets is recorded within the array.

13. The computer program product of claim 12, wherein said program code for tracking further comprises program code for:
responsive to a packet being in said at least one previous group or said current group, respectively updating a status of said previous group or said current group within said buffer.

14. The computer program product of claim 13, wherein, responsive to all packets of a group being received, said computer program product further comprises program code for:
updating a received status of said group within said array to indicate receipt of said group; and
moving said group out of said buffer.

15. The computer program product of claim 14, wherein said group is a previous group, said computer program product further comprising program code for:
identifying said current group as a previous group, wherein a next group is selected as the current group; and
when a final packet has not been received, subsequently tracking packets for said next current group within said buffer.

16. The computer program product of claim 14, wherein said program code for updating further comprises program code for:
responsive to a receipt of a new packet not within said current group or said at least one previous group, moving a first created previous group out of said buffer; and
updating a received status of said first created previous group within said array to indicate non-receipt of each packet of said first created previous group.

17. The computer program product of claim 16, wherein N is a multiple of 2, X is 2 and L is the number of packets in a current group, said computer program product further comprising program code for determining a group space, P, of a received packet by dividing said sequence number, M, of said packet by L, wherein a sum of a resulting quotient of said division+1 indicates the group space within the array and a remainder of said division indicates the position of the received packet within the particular group.

18. The computer program product of claim 10, said program code for compressing said array further comprises code for ANDing each value within X adjacent spaces of said array to create a first set of group values stored within a first section of said array, wherein a second set of group values are determined when packets within subsequent groups are received after the compression and stored in a second section of said array.

19. A communication network comprising:
a transmitting agent that transmits a file as a plurality of sequentially numbered packets; and
at least one receiving agent that receives said packet, wherein said receiving agent comprises:
processing logic;
a memory in which incoming packets and a tracking array are stored;
means for determining a maximum number N, corresponding to the number of sequentially numbered spaces within said tracking array utilized for tracking said incoming packets;
means for receiving an incoming packet and identifying a sequence number, M, of said incoming packet;
means, responsive to receipt of a packet with sequence number, M, that is greater than a current maximum number that may be tracked by said tracking array, for compressing spaces within said tracking array in multiples of X, where X is an integer, and N is a multiple of X, to create an array of N group values, wherein each group value indicates whether or not each packet within a particular group of packets assigned to a particular array space was received, wherein a number of packets within said particular group is initially 1 and increases by a factor of X after each compression; and means for setting a value of said particular array space of said tracking array to a first value indicating receipt of all packets within said particular group of packets, wherein said value is set to a second value when all of said packets within said particular group of packets have not been received.

20. The communication network of claim 19, further comprising:

means, responsive to a receipt of a final packet of a file being transmitted, for checking said array for occurrence of holes, each hole representing that at least one packet within a group was not received; and means for issuing a request for each packet within a group whose array space contains a hole, wherein an entire group is re-requested when said hole is found.

21. The communication network of claim 19, wherein:

Y packets are received at a time by said receiving terminal, where Y is an integer with value greater than 1, and said Y packets may be received out of sequential order with respect to each other;

said communication network further comprising:

means for tracking each packet in a buffered storage area comprising a current group and at least one previous group, wherein each of said received packets are sorted into their respective groups before a received status of a group corresponding to the received packets is recorded within the array.

22. The communication network of claim 21, wherein said tracking means further comprises:

means, responsive to a packet being in said at least one previous group or said current group, for respectively updating a status of said previous group or said current group within said buffer.

23. The communication network of claim 22, wherein, responsive to all packets of a group being received, said communication network further comprises:

means for updating a received status of said group within said array to indicate receipt of said group; and means for moving said group out of said buffer.

24. The communication network of claim 23, wherein said group is a previous group, said communication network further comprising:

means for identifying said current group as a previous group, wherein a next group is selected as the current group; and means, when a final packet has not been received, for subsequently tracking packets for said next current group within said buffer.

25. The communication network of claim 23, wherein said updating means further comprises:

means, responsive to a receipt of a new packet not within said current group or said at least one previous group, for moving a first created previous group out of said buffer; and means for updating a received status of said first created previous group within said array to indicate non-receipt of each packet of said first created previous group.

26. The communication network of claim 25, wherein N is a multiple of 2, X is 2 and L is the number of packets in a current group, said communication network further comprising:

means for determining a group space, P, of a received packet by dividing said sequence number, M, of said packet by L, wherein a sum of a resulting quotient of said division+1 indicates the group space within the array and a remainder of said division indicates the position of the received packet within the particular group.

27. The communication network of claim 19, wherein said network supports multicast transmission.

28. The communication network of claim 19, wherein said compression means further comprises means for ANDing each value within X adjacent spaces of said array to create a first set of group values stored within a first section of said array, wherein a second set of group values are determined when packets within subsequent groups are received after the compression and stored in a second section of said array.

* * * * *

UNITED STATES PATENT AND TRADEMARK OFFICE
CERTIFICATE OF CORRECTION

PATENT NO. : 6,983,334 B2 Page 1 of 1
APPLICATION NO. : 10/007190
DATED : January 3, 2006
INVENTOR(S) : Linda A. Riedle It is certified that error appears in the above-identified patent and that said Letters Patent is hereby corrected as shown below:

On the Cover Page, at column 1, line 1 under US Patent Document, delete "5,151,889 A 9/1992 Saiml et al." and insert --5,151,899 A 9/1992 Thomas et al.--.

Signed and Sealed this

Twenty-second Day of August, 2006

JON W. DUDAS
*Director of the United States Patent and Trademark Office*